United States Patent
Miliefsky

(10) Patent No.: US 7,346,922 B2
(45) Date of Patent: Mar. 18, 2008

(54) PROACTIVE NETWORK SECURITY SYSTEM TO PROTECT AGAINST HACKERS

(75) Inventor: Gary Miliefsky, Tyngsboro, MA (US)

(73) Assignee: NetClarity, Inc., Bedford, MA (US)

( * ) Notice: Subject to any disclaimer, the term of this patent is extended or adjusted under 35 U.S.C. 154(b) by 738 days.

(21) Appl. No.: 10/898,900

(22) Filed: Jul. 26, 2004

(65) Prior Publication Data

US 2005/0044418 A1    Feb. 24, 2005

Related U.S. Application Data

(60) Provisional application No. 60/489,982, filed on Jul. 25, 2003.

(51) Int. Cl.
| G06F 7/04 | (2006.01) |
| G06F 7/58 | (2006.01) |
| G06F 15/16 | (2006.01) |
| G06F 17/30 | (2006.01) |
| G06K 9/00 | (2006.01) |
| G06K 19/00 | (2006.01) |

(52) U.S. Cl. ............... 726/3; 726/4; 726/5; 726/11; 726/22; 726/23

(58) Field of Classification Search .......... 726/3–15, 726/22–25
See application file for complete search history.

(56) References Cited

U.S. PATENT DOCUMENTS

| 6,511,322 B1 * | 1/2003 | Kometas | 433/166 |
| 7,086,089 B2 * | 8/2006 | Hrastar et al. | 726/22 |
| 7,159,237 B2 * | 1/2007 | Schneier et al. | 726/3 |
| 7,194,004 B1 * | 3/2007 | Thomsen | 370/401 |
| 7,197,762 B2 * | 3/2007 | Tarquini | 726/3 |
| 7,260,726 B1 * | 8/2007 | Doe et al. | 713/189 |
| 7,272,646 B2 * | 9/2007 | Cooper et al. | 709/223 |
| 2003/0014662 A1 * | 1/2003 | Gupta et al. | 713/200 |
| 2003/0204632 A1 * | 10/2003 | Willebeek-LeMair et al. | 709/249 |
| 2003/0236994 A1 * | 12/2003 | Cedar et al. | 713/200 |
| 2004/0215978 A1 * | 10/2004 | Okajo et al. | 713/201 |

OTHER PUBLICATIONS

Martin, Robert "Managing Vulnerabilities in Networked Systems." The Mitre Corp. IEEE Computer Society Computer Magazine, vol. 34, No. 11, Nov. 2001 http://cve.mitre.org/about/documents.html pp. 32-38.*
Martin, Robert et al. "A Progress Report on the CVE Initiative." The Mitre Corp. FIRST 14th Annual Computer Security Incident Handling Conference Jun. 24, 2002 http://cve.mitre.org/about/documents.html pp. 1-22.*

* cited by examiner

Primary Examiner—Ayaz Sheikh
Assistant Examiner—Nicole M Young
(74) Attorney, Agent, or Firm—Strategic Patents, P.C.

(57) ABSTRACT

A proactive network security system to protect against hackers for the proactive automated defense against hackers by automatically finding, reporting, communicating with countermeasures about and removing the common vulnerabilities and exposures (CVEs) that they exploit.

1 Claim, 9 Drawing Sheets

Anti-hacker System

Proactive Network Security

Anti-hacker System Software

Anti-hacker System Hardware (appliance)

Anti-hacker System Hardware (appliance)

PROACTIVE NETWORK SECURITY SYSTEM TO PROTECT AGAINST HACKERS

RELATED APPLICATIONS

This application claims priority to U.S. Provisional Application No. 60/489,982, filed Jul. 25, 2003, the specification of which is incorporated herein by reference in its entirety.

BACKGROUND

For years, network administrators have been plagued by the issue of unauthorized users (hackers) who gain entry to the network by probing for weaknesses or misrepresenting their intentions when asking to use certain network services, such as asking for a network user to read an email message. As such, it can be appreciated that anti hacker security system have been in use for years. Typically, anti hacker security systems are comprised of information security (INFOSEC) appliances that protect computers and computer-based networks against attacks from hackers. These appliances are typically sold as point-solutions and countermeasures ranging from Firewalls (FW), virtual private networks (VPNS) AntiVirus Servers (AVS), Anti Distributed Denial of Service (Anti-DDoS), Certificate Authorities (CA), Content Filtering and Application Caching (PROXY), Encryption Acceleration and Secure Sockets Layer (SSL), Intrusion Detection Systems (IDS), Intrusion Prevention Systems (IPS), Vulnerability Assessment (VA), Vulnerability Remediation (VR), and Wireless Security (802.11b) using Wireless Encryption Protocol (WEP) some of which may or may not be deployed with Clustering and High Availability (HA) features with Hardened Operating Systems (HOS) and well thought out and customer tested Human Factors in Design (HFID).

The main problem with conventional anti hacker security system are they are not designed to stop hackers, instead they are countermeasures that react to threats. Thus, today's security systems still leave the network vulnerable to attack, although they are capable of addressing certain attacks once the attack is identified.

Another problem with conventional anti hacker security systems is that they are typically built as proprietary systems, resulting in long design, development and release cycles. This of course can be problematic as hackers release new attacks quite frequently, and because of the Internet, these many of today's attacks spread with breathtaking speed from one network to another. In a world where attacks can spread from Asia to North America in a matter of days, it is important that security measures be deployed as quickly as possible. It is also important that the INFOSEC security measures be designed to scale more easily so that improvements in central processing unit (CPU) power, memory and storage can be made available on a regular basis. Unfortunately, most of today's INFOSEC solutions are hard to upgrade and manage. For example, many of today's INFOSEC appliances have been "hard wired" with a CPU, and thus over time will be able to keep up with user demand. In fact, many INFOSEC systems today are "hard wired" with one or more network adapter interface for a 10 megabits per second network and if the network performance requirements move to 100 megabits per second or a gigabit per second, these INFOSEC appliances become bottlenecks to network performance and therefore detract from user productivity. Still another problem with conventional anti hacker security system are that each INFOSEC appliance has a completely different and unique administrative interface. After deploying more than a few of these appliances, it becomes extremely difficult for System Administrators (SYSADMINs) to manage these systems.

Thus, there is a need for improved security systems.

SUMMARY OF THE INVENTION

In view of the foregoing disadvantages inherent in the known types of anti hacker security system, the systems and methods described herein provide proactive network security systems that protect against hackers and may automatically find, report, and communicate with countermeasures and remove the common vulnerabilities and exposures (CVEs) that they exploit.

To this end, the systems and methods herein, in one embodiment, generally comprise a human factors in design (HFID) graphical user interface (GUI) for secure configuration and administration, a DYNAMIC UPDATES engine, an INFOSEC engine, INFOSEC engine PLUGINs and communications interfaces. Optionally the interfaces may include interfaces for one or more Firewalls (FW), virtual private networks (VPNS) AntiVirus Servers (AVS), Anti Distributed Denial of Service (Anti-DDoS), Certificate Authorities (CA), Content Filtering and Application Caching (PROXY), Encryption Acceleration and Secure Sockets Layer (SSL), Intrusion Detection Systems (IDS), Intrusion Prevention Systems (IPS), honeypot systems (HPS), Vulnerability Assessment (VA), Vulnerability Remediation (VR), and Wireless Security (802.11b) using Wireless Encryption Protocol (WEP), Clustering and High Availability (HA) features with Hardened Operating Systems (HOS) and "open box" PC or generic server appliance hardware on which to deploy the invention.

The software engine may securely and dynamically update one or all components of the INFOSEC ENGINE and/or all INFOSEC ENGINE PLUGINs as well as other key security components. The software engine acts as a gateway between users, personal computers, servers, services and the computer network (internet, intranet, extranet, wide area network, wireless network or local area network). An Information Security (INFOSEC) software component may plug into the INFOSEC engine to, from time to time, expand the INFOSEC capabilities. Sample PLUGINs may include Firewalls (FW), virtual private networks (VPNs) AntiVirus Servers (AVS), Anti Distributed Denial of Service (Anti-DDoS), Certificate Authorities (CA), Content Filtering and Application Caching (PROXY), Encryption Acceleration and Secure Sockets Layer (SSL), Intrusion Detection Systems (IDS), Intrusion Prevention Systems (IPS), Vulnerability Assessment (VA), Vulnerability Remediation (VR), and Wireless Security (802.11b) using Wireless Encryption Protocol (WEP), Clustering and High Availability (HA). The system may also include an operating system that has been hardened against known weaknesses and attack methodologies of hackers. In a further optional embodiment, the system may include a software component that enables the INFOSEC Engine to be deployed on more than one system that can act as a single INFOSEC Engine through a computer network. An optional software component "heart-beat" monitor may exchange heartbeat signals between two or more INFOSEC appliances and enables one appliance to takeover for another should the other malfunction. The systems and methods described herein can be operated on conventional hardware platforms including Personal Computer (PC) or generic server appliances that run the Windows or Linux operating systems. Optionally, the systems may employ a client-server modular based software structure for secure, authenticated an non-repudiable communications between the Proactive Network Security system and a traditional Countermeasures System to increase the probability that a hacker will not be able to break into the existing network infrastructure through automated vulnerability assessment, reporting, and remediation.

There has thus been described certain features of the invention in order that the detailed description thereof may be better understood, and in order that the present contribution to the art may be better appreciated. There are additional features of the invention that will be described hereinafter.

It is to be understood that the invention is not limited to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a proactive network security system to protect against hackers that will overcome the shortcomings of the prior art devices.

An object of the present invention is to provide a proactive network security system to protect against hackers for the proactive automated defense against hackers by automatically finding, reporting, communicating with countermeasures about and removing the common vulnerabilities and exposures (CVEs) that they exploit.

Another object is to provide a proactive network security system to protect against hackers that acts as a proactive network security and anti-hacker system, that stops most hackers and reduces the risk of attack by the most dangerous and knowledgeable hackers, one that is built upon "open box" PC and/or appliance server architecture to leverage unique software that combines best-of-breed INFOSEC algorithms and techniques with a focus on human factors design (HFID), unification of multiple security applications and development platform to sustain technology currency, the solution achieved contains novel and potentially major advances toward ubiquitous deployment of solid, scaleable defenses against hackers, blended threats and insider attacks.

Another object is to provide a proactive network security system to protect against hackers that can more easily be managed by creating a single HFID graphical user interface (GUI) that runs securely in industry standard web browsers using built-in secure socket layer (SSL) for encryption and user authentication.

Another object is to provide a proactive network security system to protect against hackers that contains an INFOSEC engine that can be dynamically upgraded through secure means.

Another object is to provide a proactive network security system to protect against hackers that contains a GUI Engine that can be dynamically upgraded through secure means.

Another object is to provide a proactive network security system to protect against hackers that contains a CPU, memory, hard drive for storage that can all be easily upgraded with "open box" off-the-shelf solutions.

Another object is to provide a proactive network security system to protect against hackers that can be trusted by providing open source to key INFOSEC algorithms that are embedded within the INFOSEC engine (such as OpenSSL Engine, for example).

Another object is to provide a proactive network security system to protect against hackers that can perform numerous INFOSEC functions in one "open box" appliance that scales in physical size from a small PC to a large generic server appliance. Should these INFOSEC functions exist in another network security appliance, the systems described herein shall be able to communicate with said INFOSEC countermeasure through a well-defined and secure communication interface to enable more proactive network security through automation.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only; and that changes may be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 8 is a sample "open box" very small hardware device that the present invention can be deployed on.

DETAILED DESCRIPTION

Figure 1:
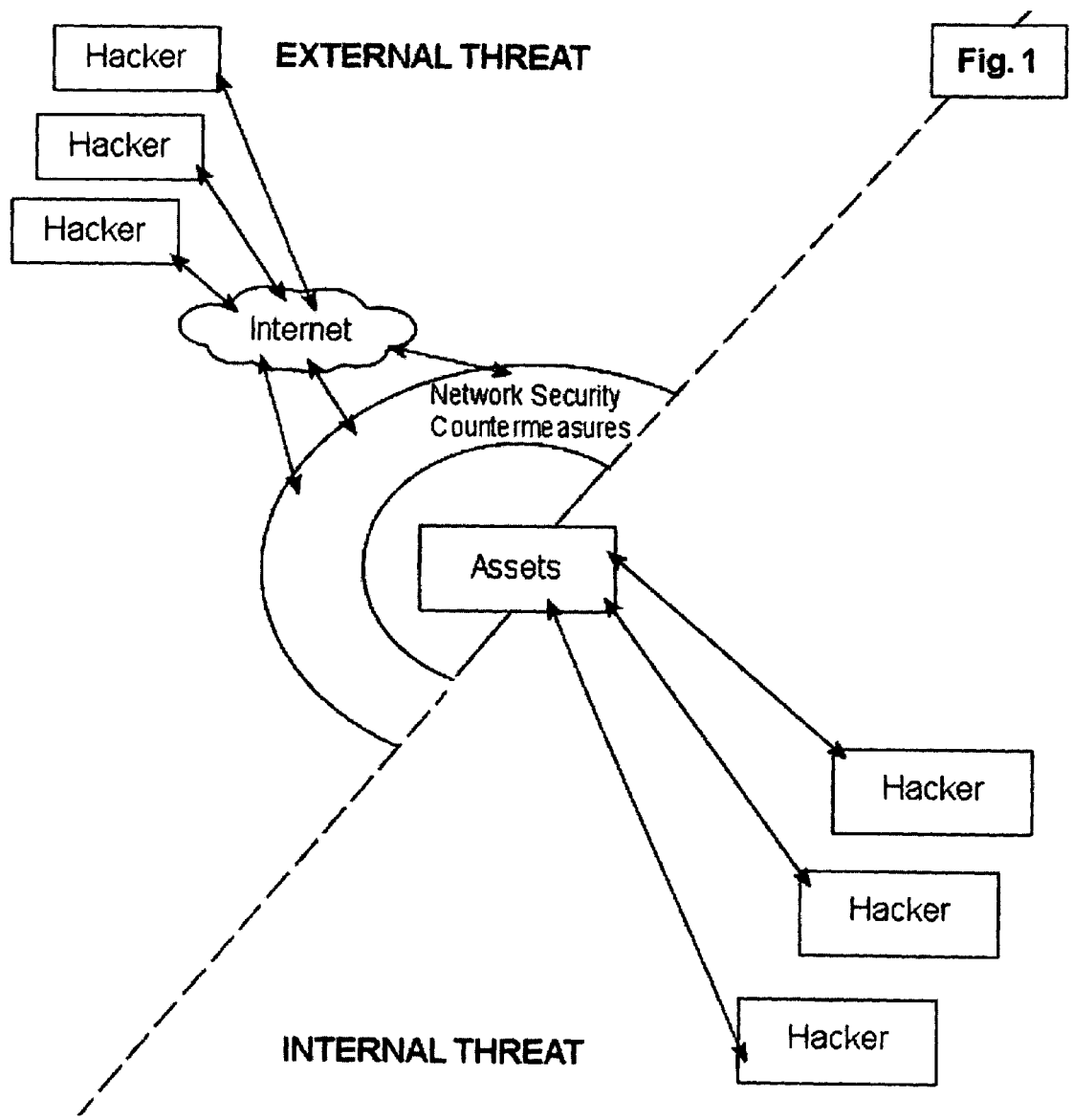
FIG. 1 is hackers' view of computer-based assets connected to an internal and external network.
Figure 2:
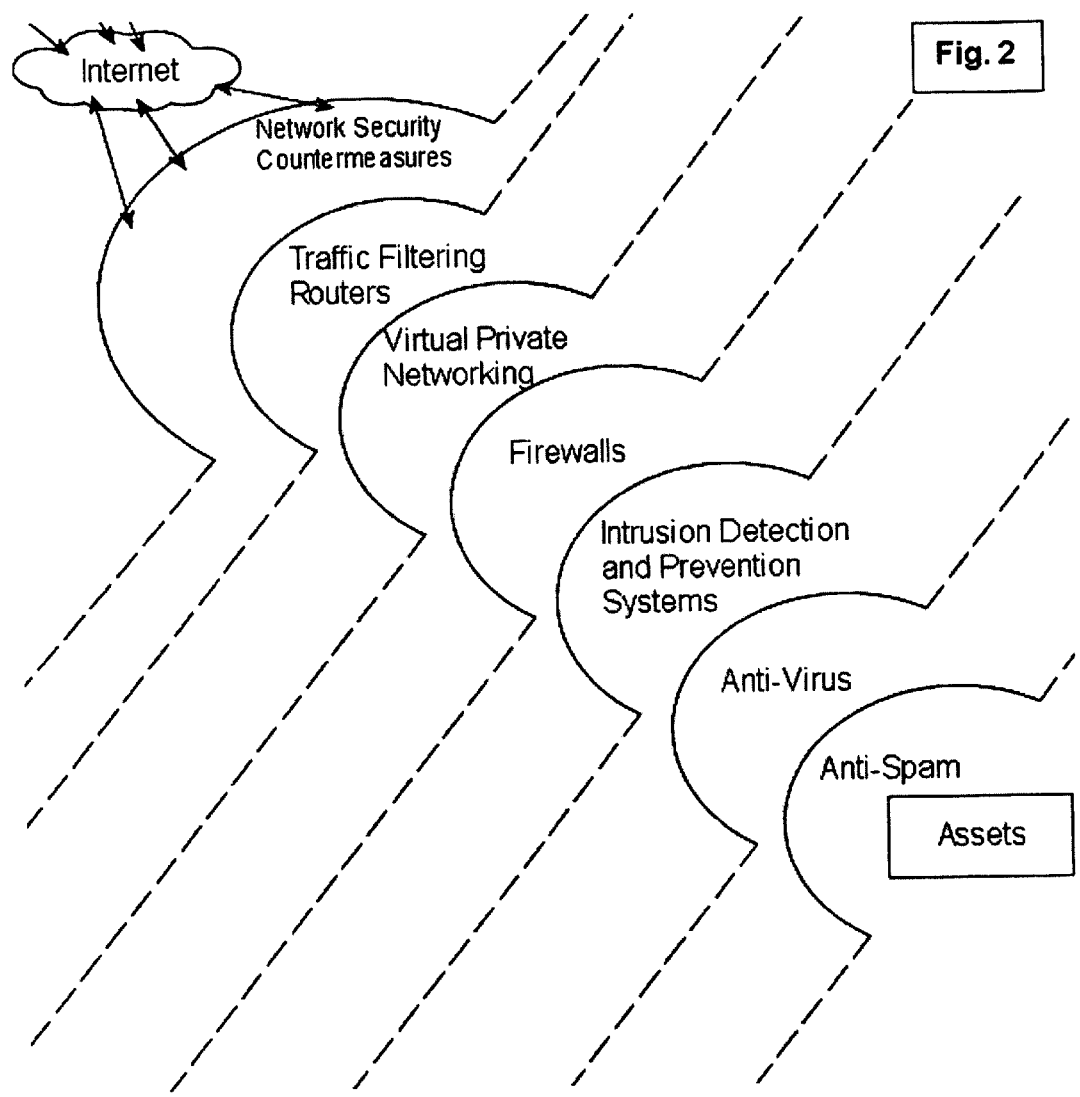
FIG. 2 are typical layers of network security countermeasures designed to protect computer-based assets.
Figure 3:
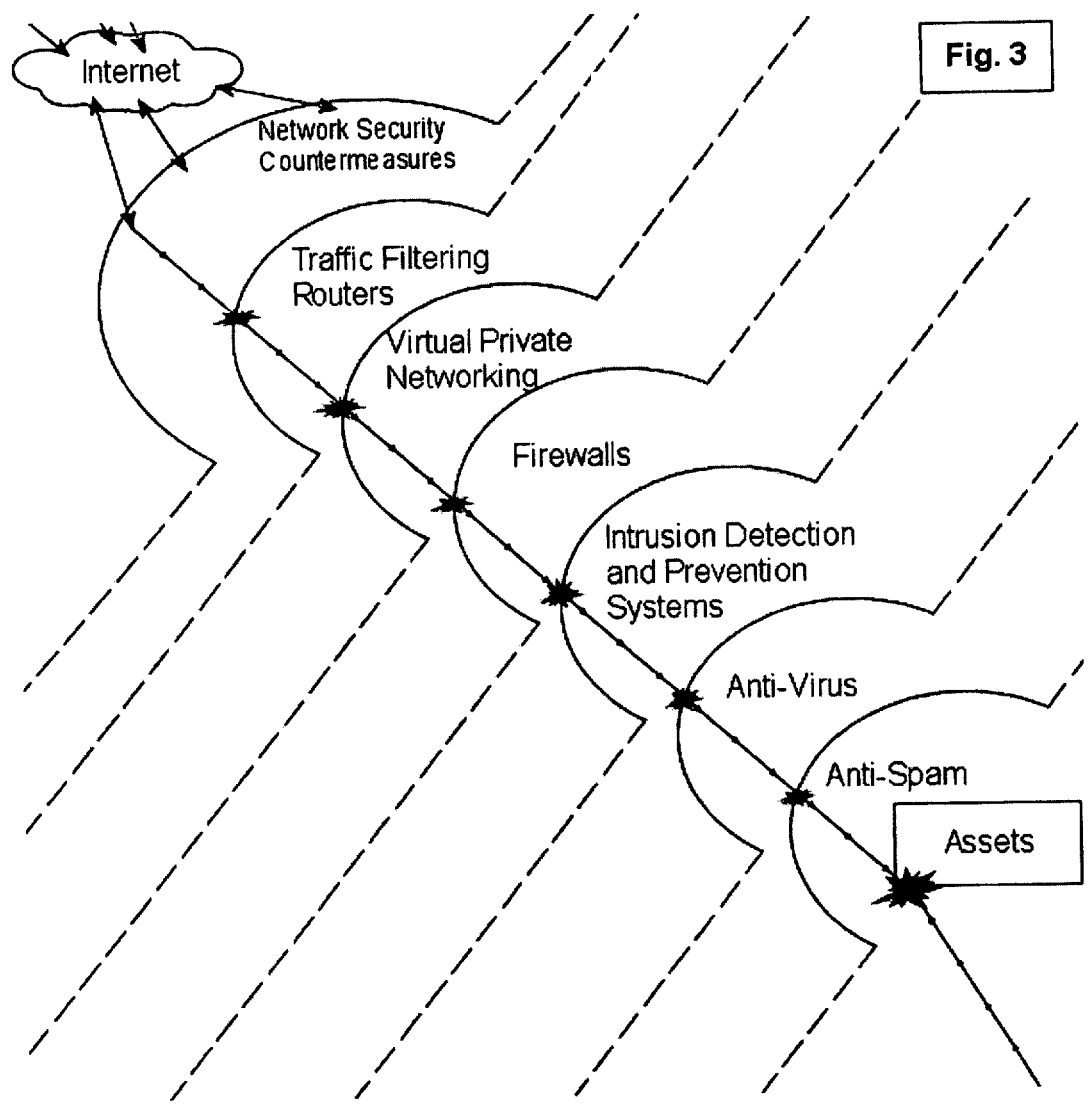
FIG. 3 are typical points of entry of known CVEs for hackers to leverage and attack computer-based assets.
Figure 4:
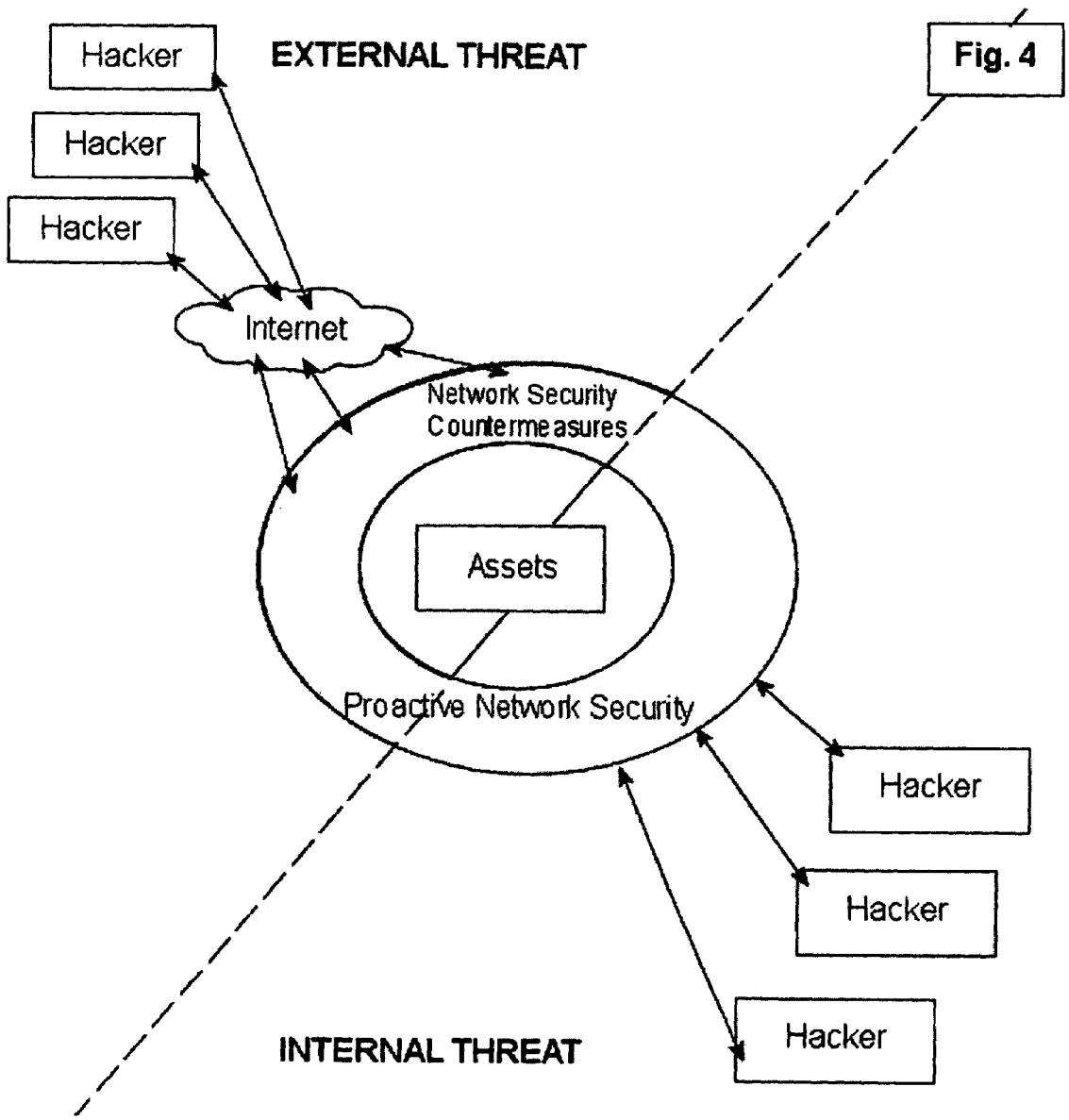
FIG. 4 is a view of computer-based assets as protected from internal and external attacks by hackers.
Figure 5:
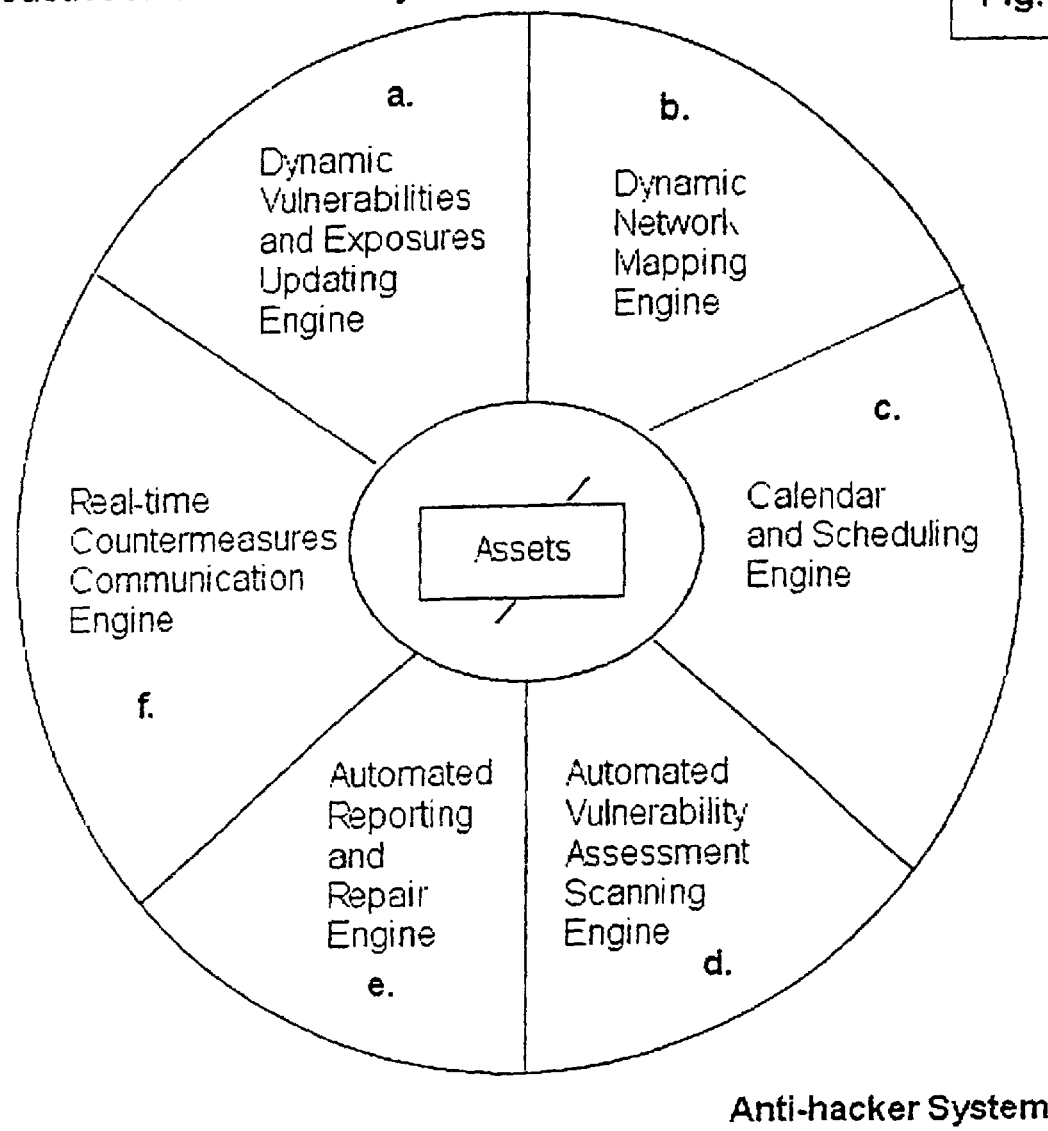
FIG. 5 is a view of the invention's approach to proactive network security to protect computer-based assets.

The system and methods described herein include, among other things, security systems that provide proactive automated defense against hackers by automatically finding, reporting, communicating with countermeasures about and removing the common vulnerabilities and exposures (CVEs) that they exploit. Accordingly, the systems described herein provide for proactive security by determining the components that exist on a network system and generating a list of network assets.

In one embodiment, the invention provides a security method that can be executed on a wired and/or wireless network. As part of the security method, in a first step the network is scanned and/or probed for any and all attached equipment and related assets, herein referred to as "network-based" assets. The method will dynamically detect and map changes to LAN and WAN connected equipment including searching for equipment which may be deemed as rogue and creating a network-based assets list, wherein the list contains information as to the location of the network-based assets.

The list may contain information as to the Internet Protocol (IP) address of said network-based assets, and the list may contain information as to the open Ports of said network-based assets and related application, session, transport, sockets and other internet protocol (IP) related information. The list may contain other information such as the Media Access Control (MAC) address of said network-based assets, whether the connection is Wired or Wireless of said network-based assets and other information about the structure of the network and its component devices.

The information contained in the list may change automatically and at pre-scheduled intervals as network-based assets are moved or relocated.

In a further step, the method audits one or more of the network-based assets for common vulnerabilities and exposures (CVEs) as defined by the U.S. federally funded CVE list managed by MITRE corporation or any similar list. The method will generate a CVE and related regulatory compliance audit reports and update the CVE and related regulatory compliance audit tests. In a further step the method can share MAC, IP, Port, CVE and related regulatory compliance other related audit data with various INFOSEC countermeasures designed to help protect network-based assets against attacks.

The method may then activate an INFOSEC engine to update plugins to ensure the system continues to stay current with methodologies to protect against hackers in a proactive way.

The method defines a true risk profile for the computer-based network environment, and uses the knowledge of external and internal CVEs as well as how to manage and remediate against these CVEs, to provide more robust and proactive security.

Turning now descriptively to the drawings, in which similar reference characters denote similar elements throughout the several views, the attached figures illustrate a proactive network security system to protect against hackers, which comprises a human factors in design (HFID) graphical user interface (GUI) for secure configuration and administration, a DYNAMIC UPDATES engine, an INFOSEC engine, INFOSEC engine PLUGINs and communications interface possibly including one or more of the following but not limited to Firewalls (FW), virtual private networks (VPNS) AntiVirus Servers (AVS), Anti Distributed Denial of Service (Anti-DDoS), Certificate Authorities (CA), Content Filtering and Application Caching (PROXY), Encryption Acceleration and Secure Sockets Layer (SSL), Intrusion Detection Systems (IDS), Intrusion Prevention Systems (IPS), honeypot systems (HPS), Vulnerability Assessment (VA), Vulnerability Remediation (VR), and Wireless Security (802.11b) using Wireless Encryption Protocol (WEP), Clustering and High Availability (HA) features with Hardened Operating Systems (HOS) and "open box" PC or generic server appliance hardware on which to deploy the invention, a human factors in design (HFID) graphical user interface (GUI) for secure configuration and administration, a software engine that can securely and dynamically update one or all components of the INFOSEC ENGINE and/or all INFOSEC ENGINE PLUGINs as well as other key security components of the invention, an Information Security (INFOSEC) software engine that acts as a gateway between users, personal computers, servers, services and the computer network (internet, intranet, extranet, wide area network, wireless network or local area network), an Information Security (INFOSEC) software component that plugs into the INFOSEC engine to expand the INFOSEC capabilities of the solution. Sample PLUGINs may include one or more of the following but not limited to Firewalls (FW), virtual private networks (VPNS) AntiVirus Servers (AVS), Anti Distributed Denial of Service (Anti-DDoS), Certificate Authorities (CA), Content filtering and Application Caching (PROXY), Encryption Acceleration and Secure Sockets Layer (SSL), Intrusion Detection Systems (IDS), Intrusion Prevention Systems (IPS), Vulnerability Assessment (VA), Vulnerability Remediation (VR), and Wireless Security (802.11b) using Wireless Encryption Protocol (WEP), Clustering and High Availability (HA). The system uses an operating system that has been hardened against known weaknesses and attack methodologies of hackers. The system has a software component that enables the INFOSEC Engine to be deployed on more than one OPEN-BOX HARDWARE systems that can act as one single INFOSEC Engine through a computer network. The system may also employ a software component that acts like a human "heartbeat" between two or more INFOSEC appliances and enables one appliance to takeover for another should the other malfunction, any Personal Computer (PC) or generic server appliance that can run the Windows or Linux operating systems. A client-server modular based software system for secure, authenticated and non-repudiable communications between the Proactive Network Security system and any traditional or typical Countermeasures System to increase the probability that a hacker will not be able to break into the existing network infrastructure through automated vulnerability assessment, reporting, and remediation.

A human factors in design (HFID) graphical user interface (GUI) for secure configuration and administration may be provided. The Secure Graphical User Interface (GUI) is accessible through non-repudiable means. One method is through an HTTPS (Secured Hypertest Transfer Protocol-Secure Sockets Layer (SSL) enabled) Web Browser. At initial connection, an additional layer of security is available through a login (USERID/PASSWORD) dialog box. Once logged into the Secure GUI, an administrator is able to quickly and easily navigate through graphical buttons and hyperlink text. The navigation is optimized for the most rapid means of configuring, operating and managing an Anti-Hacker Proactive Network Security System. The structure of an optimized Secure GUI is dynamic in nature, based upon the modules, options and INFOSEC plugins which are loaded into the system. The functions include rapid access to the dynamic vulnerabilities and exposures updating engine to select when, if ever, to schedule updates to the system, the dynamic network mapping engine to initialize an automated scan and review of operating systems, hardware and software connected to the computer-based network, a calendar and scheduling engine with simple calendar and scheduling functions and views to allow for numerous configurations of the system, allowing the administrator to choose which computers or network equipment on Internet Protocol (IP) addresses to scan for vulnerabilities and to protect against hacker attacks, access to key features and configuration of the vulnerability assessment, access to key features and configuration of the reporting engine with data export functionality as well as the repair engine which enables an administrator to proactively choose automated repair or specialized repair on a per IP address or system basis and finally, control of the plugins and real-time countermeasures communications engine to enhance the automation of proactive network security functionality through communications with traditional countermeasures. The Secure GUI contains functions for reading and writing of configuration, reporting, management and remediation data.

A software engine can securely and dynamically update one or all components of the INFOSEC ENGINE and/or all INFOSEC ENGINE PLUGINs as well as other key security components of the invention. The dynamic updates engine will update the Anti-Hacker Proactive Network Security System with tests for the latest known common vulnerabilities and exposures (CVEs) as well as updates to the System software, as needed, including maintenance and security updates and full-system upgrade patches. The dynamic updates engine securely communicates with and authenticates to a remote updating service which may be hosted through a virtual private network or through a strong-encrypted web-based service running on a system which is publicly assessable through an IP Address and an HTTPS or other SSL-based connection. The Dynamic Updates Engine functions include requesting authentication and access to the updating service, requesting updates from the updating service, informing the updating service about system health and other non-privacy related system features and issues which may enable enhancements to the quality and proactive nature of the Anti-Hacker System. The updating engine is designed to as not to compromise true privacy and full confidentiality of the end-user for ethical and regulatory compliance issues.

An Information Security (INFOSEC) software engine acts as a gateway between users, personal computers, servers, services and the computer network (internet, intranet, extranet, wide area network, wireless network or local area network). The information Security (INFOSEC) Engine controls the computer-based network scanning, standards-based vulnerability assessment through common vulnerabilities and exposures (CVEs) testing, reporting and remediation as well as interfacing with the INFOSEC ENGINE PLUGINs. The INFOSEC Engine is structured in a modular fashion with a main controller that takes input for control from the Secure GUI modules. Functions include reading and acting upon the configuration and scheduling data as stored by the Secure GUI modules. The INFOSEC Engine contains a unique module for each vulnerability assessment CVE test as well as communication modules to enable non-intrusive testing for each unique IP Address accessible from the computer-based network. The INFOSEC Engine contains read, write and export functionality for vulnerabilities found and reported in various formats including but not limited to structured query language (SQL) databases and tables, portable document format (PDF), extensible markup language (XML), hypertext markup language (HTML), comma separated values (CSV) and Excel file format (XSL). The INFOSEC Engine, at initialization, is able to determine which CVE tests are available as well as which INFOSEC Engine Plugins are available and then to relay this information to the Secure GUI for administration, control and management.

An Information Security (INFOSEC) software component that plugs into the INFOSEC engine to expand the INFOSEC capabilities of the solution. Sample PLUGINs may include one or more of the following but not limited to Firewalls (FW), virtual private networks (VPNS) AntiVirus Servers (AVS), Anti Distributed Denial of Service (Anti-DDoS), Certificate Authorities (CA), Content Filtering and Application Caching (PROXY), Encryption Acceleration and Secure Sockets Layer (SSL), Intrusion Detection Systems (IDS), Intrusion Prevention Systems (IPS), Vulnerability Assessment (VA), Vulnerability Remediation (VR), and Wireless Security (802.11b) using Wireless Encryption Protocol (WEP), Clustering and High Availability (HA). The INFOSEC Engine Plugins each share a common communications interface with the INFOSEC Engine. They provide all necessary aspects of Information Security (INFOSEC) functionality, administration, reporting, management and remediation not originally built into the Anti-Hacker Proactive Network Security System so as to maintain currency with state-of-the-art INFOSEC functions and requirements. The INFOSEC Engine Plugins are unique in that they each may perform functionality ranging from vulnerability assessment, reporting, management and remediation to industry standard countermeasure functionality such as stateful packet inspecting firewall, virtual private networking through IP Security (IPSec), Secure Sockets Layer (SSL) to Intrusion Detection, Intrusion Prevention, Honeypot, Anti-Virus, to Anti-Spam and other countermeasure-based INFOSEC functionality not originally built-into the Anti-Hacker system design. These INFOSEC Engine Plugins may be securely and dynamically obtained and installed automatically or manually through the Dynamic Updates Engine.

An operating system may be employed that has been hardened against known weaknesses and attack methodologies of hackers. The Hardened Operating System is one which is deployed without any common vulnerabilities and exposures (CVEs) that a hacker might take advantage of to jeopardize the security of the Anti-Hacker Proactive Network Security System. All unnecessary functionality has been removed including but not limited to unnecessary open ports and unnecessary computer-based networking protocols, applications and system services. The Hardened Operating System may be Linux, BSD, Unix or Windows-based. It will provide all necessary functionality for the Anti-Hacker Proactive Network Security System software to function as designed but not allow for any unauthorized access to Operating System specific functionality by any administrator, end-user or unauthorized hackers.

A software component enables the INFOSEC Engine to be deployed on more than one OPEN-BOX HARDWARE systems that can act as one single INFOSEC Engine through a computer network. The Clustering software will enable multiple Anti-Hacker Proactive Network Security system computer-based network appliances which are within the same network to operate as a clustered system to share workload, as necessary for any and all functions which may be clustered such as network scanning, vulnerability assessment through CVE testing, reporting, remediation and other critical functionality that may be too CPU intensive for one system alone in a large network. The Structure of the Clustering is organic by nature and allows for multiple systems to communicate securely, sharing critical information related to any and all INFOSEC functions being performed. Functions include secure authentication and communication necessary to join a cluster, be removed from a cluster and operate as part of a cluster.

A software component acts like a human "heart-beat" between two or more INFOSEC appliances and enables one appliance to takeover for another should the other malfunction. High Availability of the Anti-Hacker Proactive Network Security System is achieved through human-like heart-beat patterns of bit sharing and clock synchronization of more than one system through one of many possible means including but not limited to IP-based communication over computer-based network cables, hubs, switches, routers or other devices or serial or USB connectivity with or without crossover cables as necessary. The High Availability component of the system is structured to enable automated recovery should one of multiple Anti-Hacker Proactive Network Security System appliances fail through hardware or software failure. Should this occur, the High Availability functions, operating in a background mode, regularly communicate as peers between two or more systems using peer-to-peer or client-server bit-based communications asking the age old question "Are you there?" and should a system not respond within a pre-defined and configurable period of time, the system asking the question will assume that the other system has failed and is offline. If a ping of the other system through computer-based networking does not achieve an acceptable response within an acceptable timeframe, the "live" system will takeover where the other system stopped. Functions to securely exchange system status and logs are run automatically during normal pre-defined and configurable schedules.

Any Personal Computer (PC) or generic server appliance may be employed that can run the Windows or Linux operating systems. The Anti-Hacker Proactive Network Security System may be deployed on any Open-Box Hardware. Open-Box Hardware is defined as any computer-based system that can operate standards-based software and operating systems included but not limited to Linux, BSD, Unix or Windows on Intel, AMD or compatible hardware systems. The Structure of the Open-Box Hardware can range from hand-held wired or wireless computer equipment to standard portable digital assistants (PDAs), laptops, desktops, servers or other computers. The functionality provided must include basis operating system, application and computer-based network connectivity.

A client-server modular based software system for secure, authenticated and non-reputable communications between the Proactive Network Security system and any traditional or typical Countermeasures System to increase the probability that a hacker will not be able to break into the existing network infrastructure through automated vulnerability assessment, reporting, and remediation. The Countermeasures Communications System enables secure communications between the Anti-Hacker Proactive Network Security System and other computer-based network equipment which may be newly designed or traditional INFOSEC countermeasure solutions such as stateful packet inspecting firewall, virtual private networking through IP Security (IPSec), Secure Sockets Layer (SSL) to Intrusion Detection, Intrusion Prevention, Honeypot, Anti-Virus, to Anti-Spam and other countermeasures-based INFOSEC functionality not originally built into the Anti-Hacker system design. The Countermeasure Communications System is structured to enable secure communications between the Anti-Hacker Proactive Network Security System and other computer-based network equipment which may be newly designed or traditional INFOSEC countermeasure solutions. Functions are available to initiate and terminate communications, allow the INFOSEC countermeasure client to initiate requests for scheduling or immediate vulnerability assessments through CVE tests, request reports in pre-defined file formats or a data feed of the results, request remediation on one, more or all of the IP Addresses which were tested or scheduled to be tested and to request dynamic updates to client INFOSEC countermeasure system.

The main components of one embodiment of this system are Open-Box Hardware, running a Hardened Operating System with optional Clustering and High Availability modules for flexible scaleability and performance requirements and to preserve the longevity of hardware investments through expandability and reusability traditionally found in Open Box Computer-based hardware systems. Other key main components include the Dynamic Network Mapping Engine, Calendar and Scheduling Engine, Automated Vulnerability Assessment Scanning Engine, Automated Reporting, Exporting and Remediation Engine, Dynamic Update Engine and the Real-time Countermeasures Communications Engine. Subcomponents include the Secure Automated Repair Client, Countermeasures Communications Client, INFOSEC Engine Plugins and Computer-based Network stacks such as the TCP/IP or similar communications stack. Each component communicates as necessary through a multi-threaded non-blocking approach. The main components call the subcomponents as necessary as driven by the calendar and schedule which is read and managed by the INFOSEC engine, as established by the administrator through the Secure GUI. Alternative variations of this invention may include a network of one or more computers operating in parallel, in a grid or in very large, secure and remote clusters performing similar functionality and using a similar open-box hardware approach as well as accelerated proprietary chipsets which may or may not include accelerated PKI, SSL, IPSec, WEP and other INFOSEC protocols over wired or wireless networks.

In operation, the Hardware is attached to a computer-based network through the standard means of connectivity including but not limited to a wired or wireless TCP/IP connection. It is then rapidly configured by the Administrator through the secure GUI. Once configured, the system can optionally scan the locally accessible network to determine network topology and gather Operating System and IP Address information. Then, the Administrator can configure various scheduled events to enable the system to automatically scan various computer-based network equipment for a complete and thorough vulnerability assessment through common vulnerabilities and exposures (CVEs) tests. Optional INFOSEC Engine Plugins may be configured and managed through the Secure GUI, as well. Optional Countermeasure Communications may be configured either through the Secure GUI or remotely through the Administrative GUI of the integrated countermeasure system. Automated vulnerability reporting will result and the administrator will be notified as to which CVEs exist on which systems and simplified instructions on how to remediate for each of the CVEs found. Automated Remediation Clients may be deployed as agents running remotely on each system within the Computer-Based network. Theses Automated Remediation Clients will take their remediation instructions securely from the Anti-Hacker Proactive Network Security system or cluster of systems, under Administrator control either automatically, manually or a combination of both. Each remediated system will no longer contain the CVE that placed the system at risk of being breached by a Hacker and risking Regulatory Compliance, Legal Liability and the risk of damage to computer-based assets.

In an alternate embodiment, the invention provides methods for auditing one or more of said network-based assets for common vulnerabilities and exposures (CVEs) as defined by the U.S. federally funded CVE list managed by MITRE corporation or any similar list as managed by other open sources occurs through security auditing server-based software engine that has an ever-growing list of CVE tests which use network-based hacking methodologies of scanning, probing, fingerprinting and other remote security access methods to find vulnerable spots in the Internet protocol stack, TCP/IP, UDP or otherwise, operating system, user access or Internet-connected applications, server software and services that should be fixed. The results are stored and compared against each network-based asset list which is pre-processed in ASCII text format for storage into a simple text file, Comma Separated Value (CSV) file, Extensible Markup Language (XML) file and Structured Query Language (SQL) database table.

Figure 6:
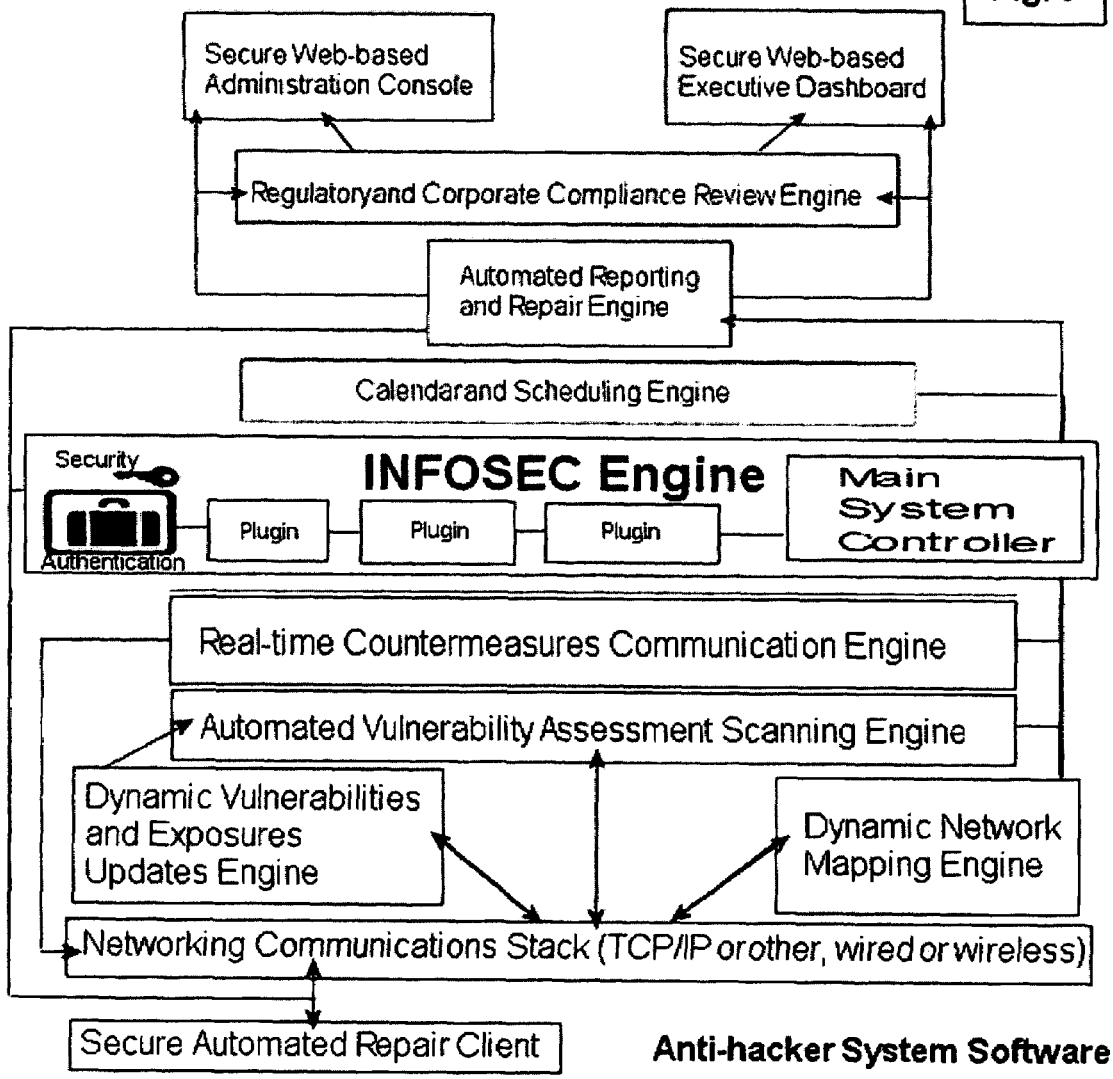
FIG. 6 is a architectural view of proactive network security system to protect against attacks by hackers.

Thee method automatically generates CVE and related regulatory compliance audit reports by taking the results of the CVE vulnerability assessment and security auditing system output and comparing each result against selected Regulatory and Corporate Compliance reviews including but not limited to any CVE which is found that may take a network-based asset out of said compliance through a weakness that creates risk of loss against non-repudiation and confidentiality of the network-based asset and all related data stored on the host of said network-based asset storage media. The method displays CVE test results in an easy to read format including conversion into HTML and PDF by reading the Comma Separated Value (CSV) file, Extensible Markup Language (XML) file and Structured Query Language (SQL) database table that hosts the CVE test results and regulatory compliance data. The method provides secure web-based GUI access to these reports by dynamically reading a list of all available CVE test results and their related reports into a simple selection list with a point and click interface for access by authorized administrators, through the Administration Console and by 'C' level executives through the Executive Dashboard interface (FIG. 6).

Figure 7:
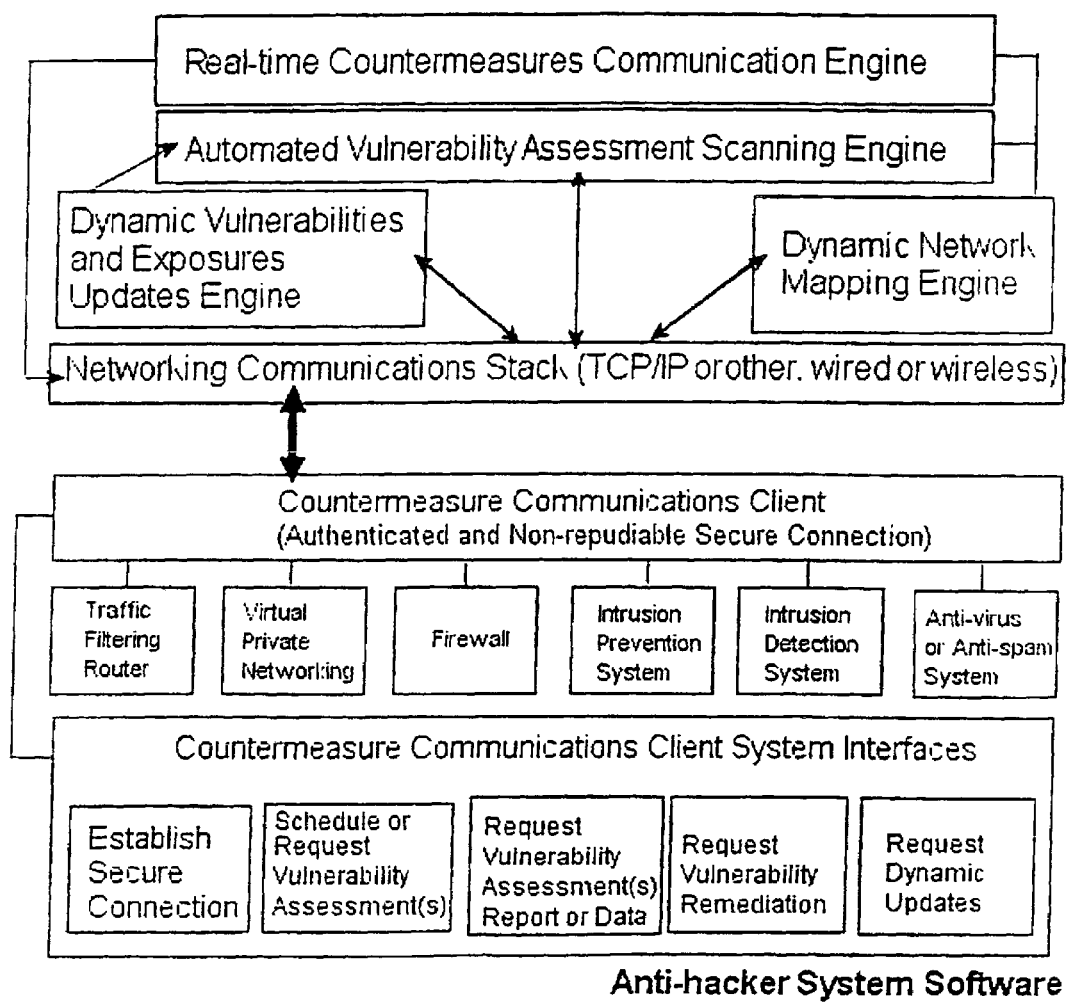
FIG. 7 is a communication interface between the proactive network security and typical countermeasures.
Figure 8:
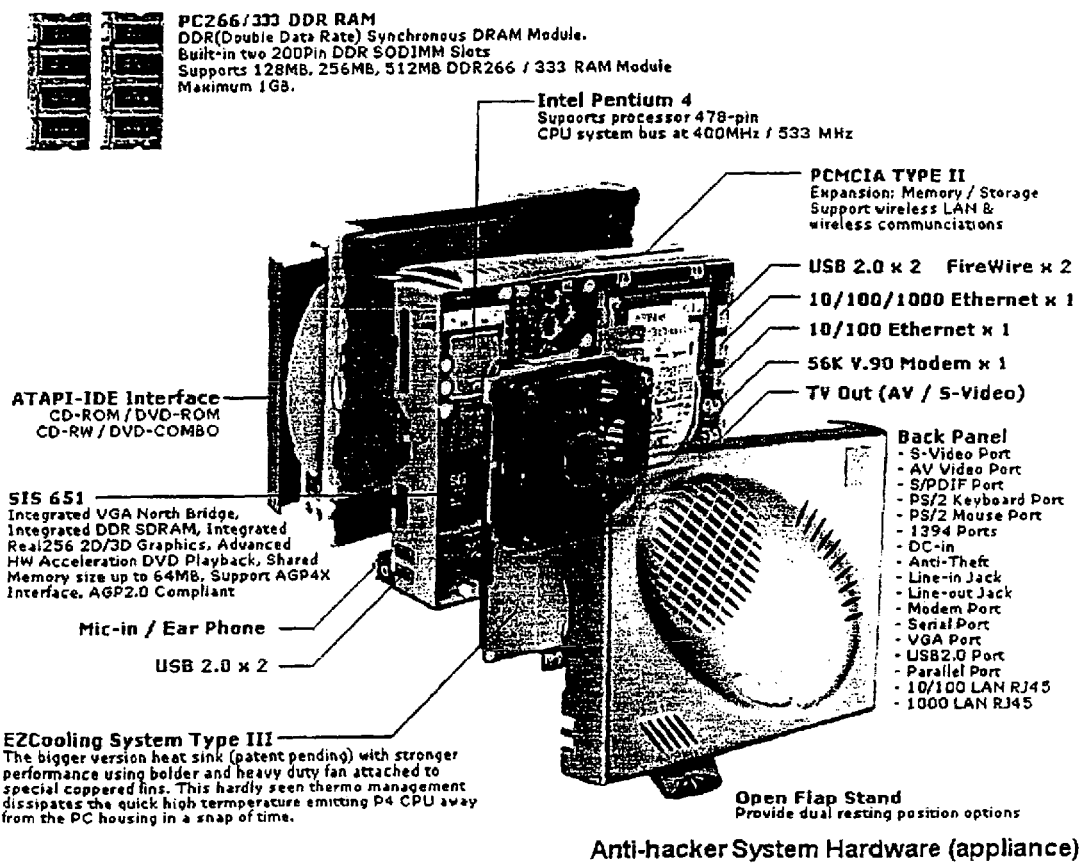
Figure 9:
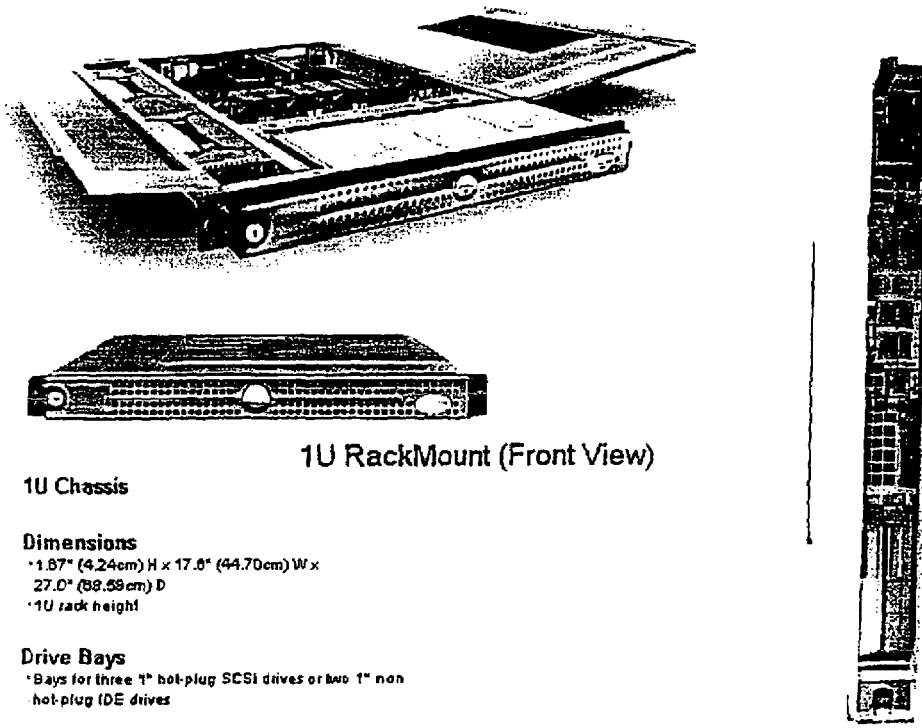
FIG. 9 is a sample "open box" 1 u rack-mount generic server appliance with the present invention installed.

The method automatically shares MAC, IP, Port, CVE and related regulatory compliance other related audit data with various INFOSEC countermeasures including but not limited to traffic filtering routers, virtual private networking equipment, firewalls, intrusion detection systems, intrusion prevention systems, anti-virus solutions, anti-spam solutions, content proxies, honeypots and other countermeasures designed to help protect network-based assets against attacks through a Real-time Countermeasures Communication Engine (FIG. 7) which uses secure access through both authenticated and non-repudiable secure connections to said INFOSEC countermeasures.

Upon establishing a secure connection, the method shares MAC, IP, Port and other necessary network-based asset identification data with the INFOSEC countermeasure to create a relationship between the two systems. This provides the INFOSEC countermeasure with the most recent CVE test data available on the network-based asset to help an IT manager manually or automatically determine how the INFOSEC countermeasure should react to the CVE test data on each network-based asset which has known weak spots that are vulnerable to attack and pose a risk to the LAN and WAN should these Ports, protocols, client or server applications not be temporarily disabled, turned off or blocked from network access until patching or CVE remediation takes place through the Secure Automated Repair Client (FIG. 6) which may or may not be available and running on the network-based asset.

In the event the INFOSEC countermeasure is a firewall or traffic filtering router, dynamic alerting of the IT manager or an alternative alert recipient and dynamic changes to the firewall rule table will take place through the Countermeasure Communications Client plug-in which has been written for that MAKE, MODEL and VERSION firewall or traffic filtering router. This may temporarily disable, turn off, or block network access either granularly through Port related CVE data or non-granularly by blocking all traffic of the said network-based asset containing the CVE(s) which need remediation.

In the event the INFOSEC countermeasure is a VPN, dynamic alerting of the IT manager or an alternative alert recipient and dynamic changes to the VPN access list will take place through the Countermeasure Communications Client plug-in which has been written for that MAKE, MODEL and VERSION VPN. This can temporarily disable, turn off, or block network access either granularly through Port related CVE data or non-granularly by blocking all traffic of the said network-based asset containing the CVE(s) which need remediation.

In the event the INFOSEC countermeasure is an IPS, dynamic alerting of the IT manager or an alternative alert recipient and dynamic changes to the IPS access list will take place through the Countermeasure Communications Client plug-in which has been written specifically for that MAKE, MODEL and VERSION IPS. In the event the INFOSEC countermeasure is an IDS, dynamic alerting of the IT manager or an alternative alert recipient and sharing the related CVE tests data with the IDS to help the IDS reduce false positives in the IDS alerting module as well as reduce the traffic load related to intrusion detections which attack a particular IP address that is not susceptible to that particular attack methodology based upon the related CVE tests data and will take place through the Countermeasure Communications Client plug-in which has been written specifically for that MAKE, MODEL and VERSION IDS.

Upon establishing a secure connection, the method may obtain dynamic updates through a secure connection (SSL) of network-based asset risk profile data, vulnerability remediation data, asset management data, CVE test data, policy, and regulatory compliance data.

The method may also automatically update INFOSEC engine plugins to ensure the system continues to stay current with methodologies to protect against hackers. To this end, it establishes a secure connection through either SSL or HTTPS to obtain any and all available INFOSEC engine plugins that are not already installed on the Proactive Network Security appliance. The users may obtain these INFOSEC engine plugins through the 'web-based' human factors in design (HFID) graphical user interface (GUI) for system administrators, also known as an 'administrative dashboard' through electronic commerce (e-commerce) functionality. This e-commerce functionality, allows the users to view which INFOSEC engine plugins have been purchased, subscription service license status and transact purchases for any and all additional INFOSEC engine plugins which are available at the time of the users' connection to the Anti-Hacker Proactive Network Security e-commerce system, hosted securely on an SSL-enabled HTTPS web server, electronically shipping INFOSEC engine plugins which have been purchased, all related license keys and electronic documentation through an SSL tunnel, via secure file transfer (FTPS) or the secure hypertext transport protocol (HTTPS Get) functionality.

These INFOSEC engine plugins may include new interfaces to various countermeasures (i.e. Firewalls, VPNs, IDS and IPS), enhanced or new CVE auditing functionality, enhanced or new regulatory compliance reporting, enhanced or new policy building tools, enhanced auditing capabilities such as rogue wireless device detection, mobile device detection, updated database tables, updated GUI features and other 'packaged' enhancements to maintain currency of the system.

The method may allow for automatically repairing CVE and related regulatory compliance weaknesses through a client-server-based system tray (SYSTRAY) interface. The system may create secure SSL on-demand client-server communication interfaces between the SYSTRAY application running on client systems with one or more server 'threads' running on the Anti-hacker Proactive Network Security system on a per network-based asset basis, and upon establishing a secure connection, obtain patch management links, instructions, modules, executable patches and security fixes through an SSL tunnel, via secure file transfer (FTPS) or the secure hypertext transport protocol (HTTPS Get) functionality between the SYSTRAY client and the Anti-hacker Proactive Network Security system serve. The system may allow for executing links, instructions, modules, executable patches and security fixes from the SYSTRAY client application for repair and remediation of CVE and related regulatory compliance weaknesses of each CVE that has been uncovered by the Anti-hacker Proactive Network Security system for said network-based asset, on a per IP address basis.

A secure sockets layer (SSL), secure hypertext transport protocol (HTTPS), also known as 'web-based' human factors in design (HFID) graphical user interface (GUI) for system administrators, may be provided to support an 'administrative dashboard' that allows system administrators to access core functionality of the Anti-hacker Proactive Network Security system. This may include those functions necessary to manage, operate and update said system, and the administrative dashboard provides access to and control of initial licensing and setup by simple web-based form-fill and point-and-click operations.

The administrative dashboard provides access online help through mouse-over popup help as well as a hypertext markup language (HTML) help system available through simple point-and-click operations. The administrative dashboard provides access to and control of basic 'headless appliance' operations such as setting system date and time, remote update, reboot, shutdown by simple web-based point-and-click operations. The administrative dashboard provides access to and control of basic alerting operations such as alert through e-mail or pager module on operating system or Anti-hacker Proactive Network Security system tampering attempts. The administrative dashboard provides access to and control of advanced alerting operations such as alert through e-mail or pager module on completion of network-based asset discovery. The administrative dashboard provides access to and control of advanced alerting operations such as alert through e-mail or pager module on completion of CVE test completion on one or more selected network-based assets on a per IP address basis. The administrative dashboard provides access to and control of advanced alerting operations such as alert through e-mail or pager module on completion of system updates. The administrative dashboard provides access to and control of alerting operations such as alert through e-mail or pager module on unauthorized attempted login to the Anti-hacker Proactive Network Security system. The administrative dashboard provides access to and control of advanced alerting operations such as alert through e-mail or pager module on XML, Really Simple Syndication (RSS) or HTML news feeds for vulnerability alerts such as BUGTRAQ or other open-source vulnerability and hacker threat news feeds. The administrative dashboard provides access to and control of advanced alerting operations such as alert through e-mail or pager module on regulatory compliance reporting and related network-based asset risk profile. The administrative dashboard provides access to and control of network-based asset discovery, policy and countermeasure enforcement functionality by simple web-based point-and-click operations. The administrative dashboard provides access to and control of calendar and scheduling automation functionality for network-based asset discovery, policy and countermeasure enforcement functionality by simple web-based point-and-click operations. The administrative dashboard provides access to and control of system administrator level reporting of the CVEs discovered, CVE and countermeasure related event correlation and related regulatory compliance risks by simple web-based point-and-click operations. The administrative dashboard provides access to and control of policy building tools by simple web-based form-fill and point-and-click operations. The administrative dashboard provides access to and control of customer-service reporting, bug tracking and reporting and related issues reporting by simple web-based form-fill and point-and-click operations.

The systems described herein may use a secure sockets layer (SSL), secure hypertext transport protocol (HTTPS), also known as 'web-based' human factors in design (HFID) graphical user interface (GUI) for executives, also known as an 'executive dashboard'. This allows executives such as a chief financial officer (CFO) or chief security officer (CSO) or chief information officer (CIO) to access of higher-level reporting functionality of the Anti-hacker Proactive Network Security system necessary to obtain CVE and regulatory related compliance reports, such as 'You have X serious CVEs in your corporate network that may take you out of compliance with Y regulation', CVE related countermeasure event alerts and high-level news feed alerts related to hacker, nationwide and worldwide hacker attack and/or new exploits, such as 'BUGBEAR now attacking U.S. Corporate networks today at 0900 EST through Outlook flaw: CVE#xyz', without overloading the executive with the detailed and granular data found in the administrative dashboard.

The executive dashboard provides access to and control of high level alerting operations such as alert through e-mail or pager module on serious risk of being out of compliance or having new CVEs discovered or detection of a rogue wired or wireless device in the network and/or Anti-hacker Proactive Network Security system subscription service about to expire. The executive dashboard provides access to and control of alerting operations such as alert through e-mail or pager module on unauthorized attempted login to the Anti-hacker Proactive Network Security system. The executive dashboard provides access to and control of which system administrators are allowed access to the Anti-hacker Proactive Network Security system.

An optional software component like a human 'heart-beat' between two or more Anti-hacker Proactive Network Security system INFOSEC appliances and enables one appliance to take over for another should the other malfunction. The usage of bit sharing and clock synchronization of more than one system through secure IP-based communications such as an SSL tunnel, via secure file transfer (FTPS) or the secure hypertext transport protocol (HTTPS Get) functionality over the LAN, WAN, or physically through serial, USB or crossover Ethernet cables to an extra network interface card (NIC) on each INFOSEC appliance. In the event serial, USB or crossover connections are used for heart-beat communications. The bit sharing and clock synchronization will occur through bit sharing and clock synchronization of two or more systems in a round-robin secure connection and data sharing. In the event one of the Anti-hacker Proactive Network Security system INFOSEC appliances does not provide a 'heart-beat' bit within a predetermined time frame, the next system to discover the lost 'heart-beat' will takeover where the lost, shutdown or physically damaged appliance left off by continuing any and all events which were last recorded and shared among 'heart-beat' enabled appliances through secure database replication.

As to further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A system comprising:

a remote updating service available through a virtual private network hosted at a public Internet Protocol address, the remote updating service maintaining a database of common vulnerabilities and exposures, and providing at least one remedial measure for each common vulnerability and exposure stored in the database;

a corporate network including two or more local area networks and a plurality of security devices including at least one traffic filtering router, at least one firewall, at least one intrusion prevention system, at least one intrusion detection system, at least one virtual private network, at least one anti-virus system and at least one anti-spam system;

a plurality of network assets including two or more computers connected to the corporate network, at least one of the plurality of network assets running a systray security application and at least one of the plurality of network assets not running a systray security application;

a first network security appliance coupled to a first one of the two or more local area networks, the appliance comprising a microprocessor executing a hardened operating system, at least one gigabyte of random access memory, a network adapter interface supporting a one-hundred-megabit-per-second network connection, and a plurality of input/output ports housed in a standard 1U rackmount enclosure, the first network security appliance adapted to scan the corporate network to identify each one of the plurality of network assets connected to the first local area network by sending and receiving Internet Protocol packets over the corporate network to determine at least a medium access controller address, an Internet Protocol address, one or more open ports, and an operating system for each network asset, and to locate each one of the plurality of network assets by using full-loop time delay for responses and the differential rate of return for at least two of a ping, a Simple Network Management Protocol request, and a Dynamic Host Configuration Protocol request, the first network security appliance storing the medium access controller address, the Internet Protocol address, the one or more open ports, and the operating system for each network asset in a relational database and in an ASCII file, the first network security appliance further adapted to scan the corporate network to identify each one of the plurality of security devices connected thereto, securely connect to the remote updating service to retrieve the at least one remedial measure for at least one common vulnerability and exposure of the plurality of security devices, and to reconfigure the plurality of security devices according to the at least one remedial measure thereby securing the corporate network against the at least one common vulnerability and exposure, the first network security appliance further comprising a secure web server that provides a graphical user interface for creating one or more reports describing regulatory security compliance of the corporate network, the first network security appliance coupled in a communicating relationship through an SSL tunnel with each one of the plurality of network assets running a systray security application, and the first network security appliance executing a separate thread for each such network asset in which the first network security appliance repairs at least one vulnerability of such network asset according to data received by the first network security appliance from the remote updating service, and the first network security appliance controlling access to the corporate network by the at least one of the plurality of network assets not running a systray security application by controlling an access list for the virtual private network;

a second network security appliance coupled to a second one of the two or more local area networks, the second network security appliance comprising a microprocessor executing a hardened operating system, at least one gigabyte of random access memory, an anti-theft device, a network adapter interface supporting a one-hundred-megabit-per-second network connection and a plurality of input/output ports housed in a free-standing enclosure that includes an open flap stand to provide at least two resting position options, the second network security appliance adapted to scan the corporate network to identify each one of the plurality of network assets connected to the second one of the two or more local area networks, and the second network security appliance including a software component that couples the second network security appliance to the first network security appliance through a secure connection, the software component synchronizing operations with the first network security appliance to permit the first network security appliance and the second network security appliance to operate as a single network security appliance for the corporate network; and a third network security appliance coupled to the first one of the two or more local area networks, the appliance comprising a microprocessor executing a hardened operating system, at least one gigabyte of random access memory, a network adapter interface supporting a one-hundred-megabit-per-second network connection, and a plurality of input/output ports housed in a standard 1U rackmount enclosure, the third network security appliance adapted to continuously synchronize with the first network security appliance using bit sharing and clock synchronization across a serial crossover cable that directly couples the third network security appliance to the first network security appliance, and the third network security appliance further adapted to periodically synchronize with the first network security appliance using a ping to the first network security appliance through the corporate network, the third network security appliance responding to a failure in synchronization by taking over all network security operations from the first network security appliance.

* * * * *